United States Patent
Twohig (10) Patent No.: US 11,349,924 B1
(45) Date of Patent: May 31, 2022

(54) MECHANISM FOR PEER-TO-PEER COMMUNICATION BETWEEN STORAGE MANAGEMENT SYSTEMS

(71) Applicant: EMC IP HOLDING COMPANY LLC, Hopkinton, MA (US)

(72) Inventor: Aaron Twohig, Killeens (IE)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/224,588

(22) Filed: Apr. 7, 2021

(51) Int. Cl.
*H04L 67/1097* (2022.01)
*H04L 67/104* (2022.01)
*H04L 67/1095* (2022.01)

(52) U.S. Cl.
CPC ........ *H04L 67/1097* (2013.01); *H04L 67/104* (2013.01); *H04L 67/1095* (2013.01)

(58) Field of Classification Search
None
See application file for complete search history.

(56) References Cited

U.S. PATENT DOCUMENTS

| | | | | |
|---|---|---|---|---|
| 8,909,996 | B2 * | 12/2014 | Srinivasan | G06F 11/2074 714/42 |
| 10,474,548 | B2 * | 11/2019 | Sanakkayala | G06F 11/1438 |
| 2005/0144189 | A1 * | 6/2005 | Edwards | G06F 16/185 |
| 2008/0120129 | A1 * | 5/2008 | Seubert | G06Q 40/125 705/305 |
| 2013/0042156 | A1 * | 2/2013 | Srinivasan | G06F 11/2074 714/54 |
| 2014/0164776 | A1 * | 6/2014 | Hook | G06F 21/6218 713/171 |
| 2016/0117318 | A1 * | 4/2016 | Helland | G06F 16/27 707/634 |
| 2017/0041296 | A1 * | 2/2017 | Ford | G06F 16/951 |
| 2017/0235848 | A1 * | 8/2017 | Van Dusen | G06F 16/904 705/12 |
| 2021/0090694 | A1 * | 3/2021 | Colley | G16B 40/00 |
| 2021/0320794 | A1 * | 10/2021 | Auh | H04L 9/0891 |

* cited by examiner

Primary Examiner — Davoud A Zand
(74) Attorney, Agent, or Firm — Anderson Gorecki LLP (57) ABSTRACT

In a storage system with multiple storage arrays configured to replicate a storage object, storage management applications are configured to exchange communications via private data replication links by encoding the communications as XML files and writing the files to their local storage array under a shared operating system. Other storage management applications poll their local storage arrays, discover the files, and then decode and read the communications. The communications may include messages, requests, and responses. Topics of interest may be specified in messages. Specific storage arrays may be designated as targets of requests. Responses are sent by encoding the responses as XML files and writing the files to respective local storage arrays under a shared operating system.

12 Claims, 6 Drawing Sheets

| Symm ID | TopicRequestProcessorMap | |
|---|---|---|
| 12345678 | Topic | RequestProcessor |
| | WLP_IMPACT | WlpImpactProcessor |
| | PERFORMANCE_QUERY | PerformanceQueryProcessor |
| 30399933 | Topic | RequestProcessor |
| | WLP_IMPACT | WlpImpactProcessor |
| | PERFORMANCE_QUERY | PerformanceQueryProcessor |
| ANY_SYMM | Topic | RequestProcessor |
| | RESTAPI_USAGE | RestUsageProcessor |

Figure 4

| Symm ID | TopicListenerMap | |
|---|---|---|
| 12345678 | Topic | Set of Message Listeners |
| | WORKLOAD_WARNING | {WorkloadWarningListener, WarningLogger} |
| | PERFORMANCE_ALERT | {PerformanceAlertListener, RemoteAlertLogger} |
| 30399933 | Topic | Set of Message Listeners |
| | WORKLOAD_WARNING | {WorkloadWarningListener, WarningLogger} |
| | PERFORMANCE_ALERT | {PerformanceAlertListener, RemoteAlertLogger} |
| ANY_SYMM | Topic | Set of Message Listeners |
| | GLOBAL_SETTING | {GlobalSettingsListener} |
| | TEST_CHAT | {TestChatListener} |

MECHANISM FOR PEER-TO-PEER COMMUNICATION BETWEEN STORAGE MANAGEMENT SYSTEMS

TECHNICAL FIELD

This disclosure is generally related to electronic data storage, and more particularly to secure peer-to-peer communication between storage management systems.

BACKGROUND

Storage area networks (SANs) and storage arrays are used to maintain large storage objects and contemporaneously support multiple host applications. A storage array includes a network of specialized interconnected compute nodes that manage access to host application data stored on arrays of non-volatile drives. The compute nodes access the data in response to input-output commands (IOs) from host applications running on servers known as "hosts." Examples of host applications may include, but are not limited to, software for email, accounting, manufacturing, inventory control, and a wide variety of other business processes.

Pairs of storage arrays can be configured to replicate a storage object. In an active-active configuration the host servers can send IOs to the storage object replicas at either storage array of the pair. In an active-passive configuration the host servers can only access the storage object from a primary storage array that maintains an active replica. However, a passive replica on the secondary storage array can quickly be made active. Consequently, storage object replication can be useful for disaster recovery, parallel processing, and data migration.

At least one management station is typically connected to each storage array via a local private communication link. A management application or client running on the management station can be used to collect information about operational status of the storage array to which the management station is connected. The information can be used for planning purposes and active management based on changing workloads. In order to aggregate information about the operational status of multiple storage arrays for coordinated storage system management it would be advantageous for the management stations to communicate with each other. However, use of dedicated private links between management stations for peer-to-peer communication would be costly and use of public internet links would expose the storage system to increased security risks.

SUMMARY

In accordance with some aspects of the invention a method for exchanging peer-to-peer communications between storage management systems comprises: a first storage management station causing a communication to be encoded as a file and written to a first storage array that is connected to the first storage management station via a first local link, including writing the file under a shared operating system running on the first storage array; the first storage array causing the file to become visible and accessible on a second storage array that is non-local relative to the first storage array and runs the shared operating system with the first storage array, and sending the file to the second storage array via a private data replication link; and a second storage management station detecting the file on the second storage array via a second local link, decoding the file, and reading the communication.

In accordance with some aspects of the invention a data replication system comprises: a first storage management station configured to encode a storage management communication as a file; a first storage array that is connected to the first storage management station via a first local link and configured to write the file under a shared operating system; a second storage array that is non-local relative to the first storage array and runs the shared operating system with the first storage array, the second storage array connected with the first storage array via a private data replication link via which the file becomes available; and a second storage management station configured to detect the file on the second storage array via a second local link, decode the file, and read the communication.

In accordance with some implementations a computer-readable storage medium stores instructions that when executed by a computer cause the computer to perform a method for exchanging peer-to-peer communications between storage management systems, the method comprising: causing a storage management communication to be encoded as an XML file and written to a first storage array that is connected to a first storage management station via a first local link, including writing the file under a shared operating system running on the first storage array, the file becoming visible and accessible on a second storage array that is non-local relative to the first storage array and runs the shared operating system with the first storage array, and sends the file to the second storage array via a private data replication link; and a second storage management station detecting the file on the second storage array via a second local link, decoding the file, and reading the communication.

Other aspects, features, and implementations will become apparent in view of the detailed description and figures. All examples, aspects and features mentioned in this document can be combined in any technically possible way.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer.

The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
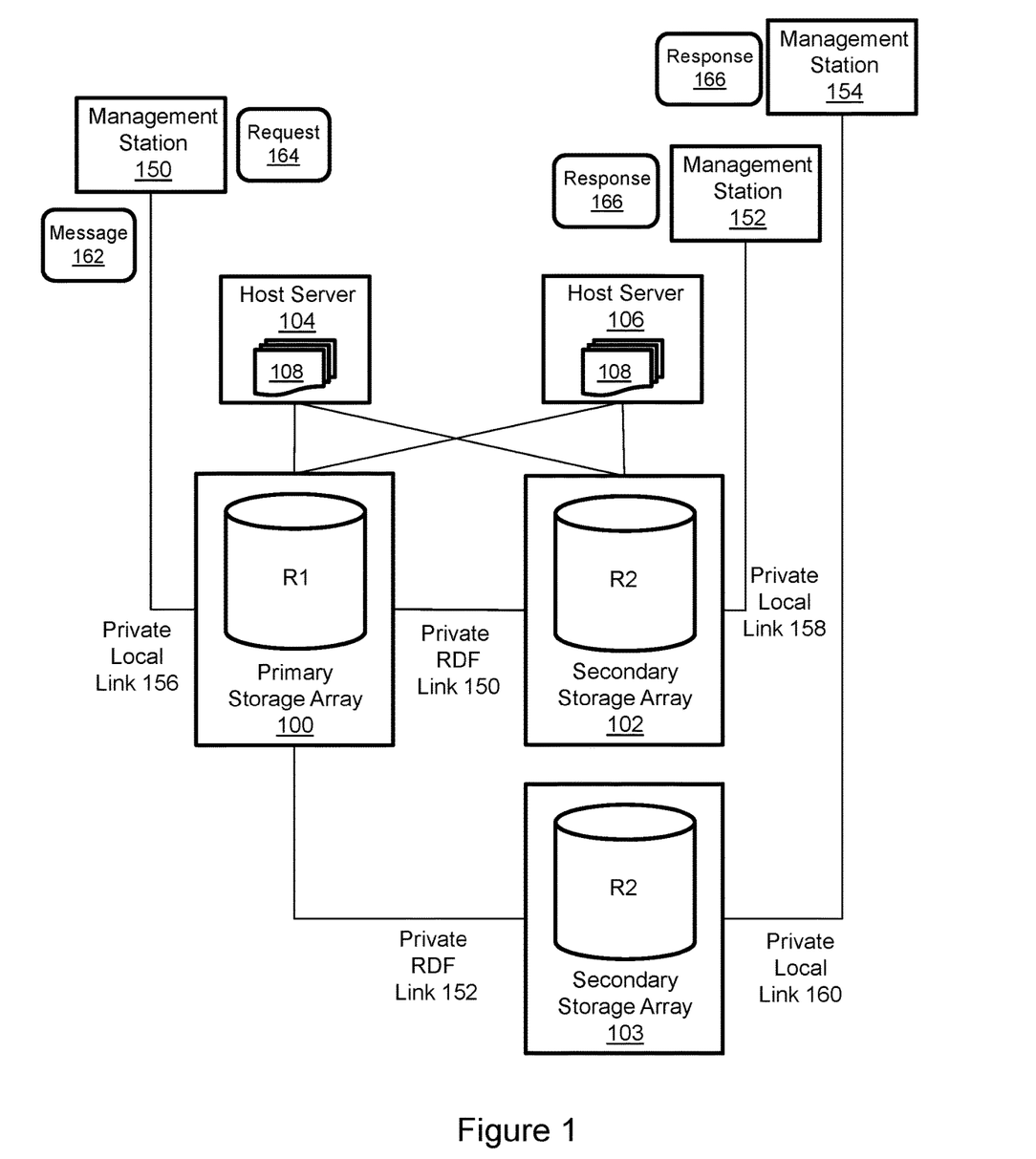
FIG. 1 illustrates peer-to-peer management station communications via private remote data facility (RDF) links between storage arrays that are configured for remote replication.

FIG. 1 illustrates peer-to-peer management station communications via private remote data facility (RDF) links between storage arrays that are configured for remote replication. For context, and without limitation, an active-passive replication configuration will be described. A primary storage array 100 maintains an active replica R1 and two secondary storage arrays 102, 103 maintain corresponding passive replicas R2. In other words, R1 and both R2s are replicas of the same storage object. Host servers 104, 106 run instances of a host application 108. Host application data is maintained on the replicated storage object. The instances of the host application prompt generation of IOs that are sent to the primary storage array 100 and serviced by accessing the replicated storage object. The active replica R1 is updated by IOs such as Writes. In order to maintain consistency between that active replica R1 and the passive replicas R2, the primary storage array 100 sends replication data corresponding to the writes to the secondary storage arrays 102, 103 via private RDF links 150, 152. The secondary storage arrays use the replication data to update the passive replicas R2 to be consistent with the active replica R1.

The private RDF links 150, 152 may be, but are not necessarily, privately owned, leased, or managed communication links. For example, and without limitation, RDF link control and privacy may be implemented at the physical layer or data link layer. The private RDF links may be part of a carrier network. For security and other reasons, the private RDF links are not carried over the public internet. Further, for purposes of explanation, the private RDF links are not local links. The storage arrays are remotely located relative to each other, e.g., in different data centers.

Each storage array 100, 102, 103 is connected to a respective management station 150, 152, 154 via a respective private local link 156, 158, 160. The management stations exchange peer-to-peer communications with each other via the private RDF links between the storage arrays. Examples of peer-to-peer communications may include, but are not limited to, messages 162, requests 164, and responses (to requests) 166. Because the storage arrays are not configured to function as switches, routers, or other types of network nodes, the management stations cannot simply send packets with the IP addresses of other management stations to the local storage array with an expectation of delivery via IP routing over the RDF links.

Figure 2:
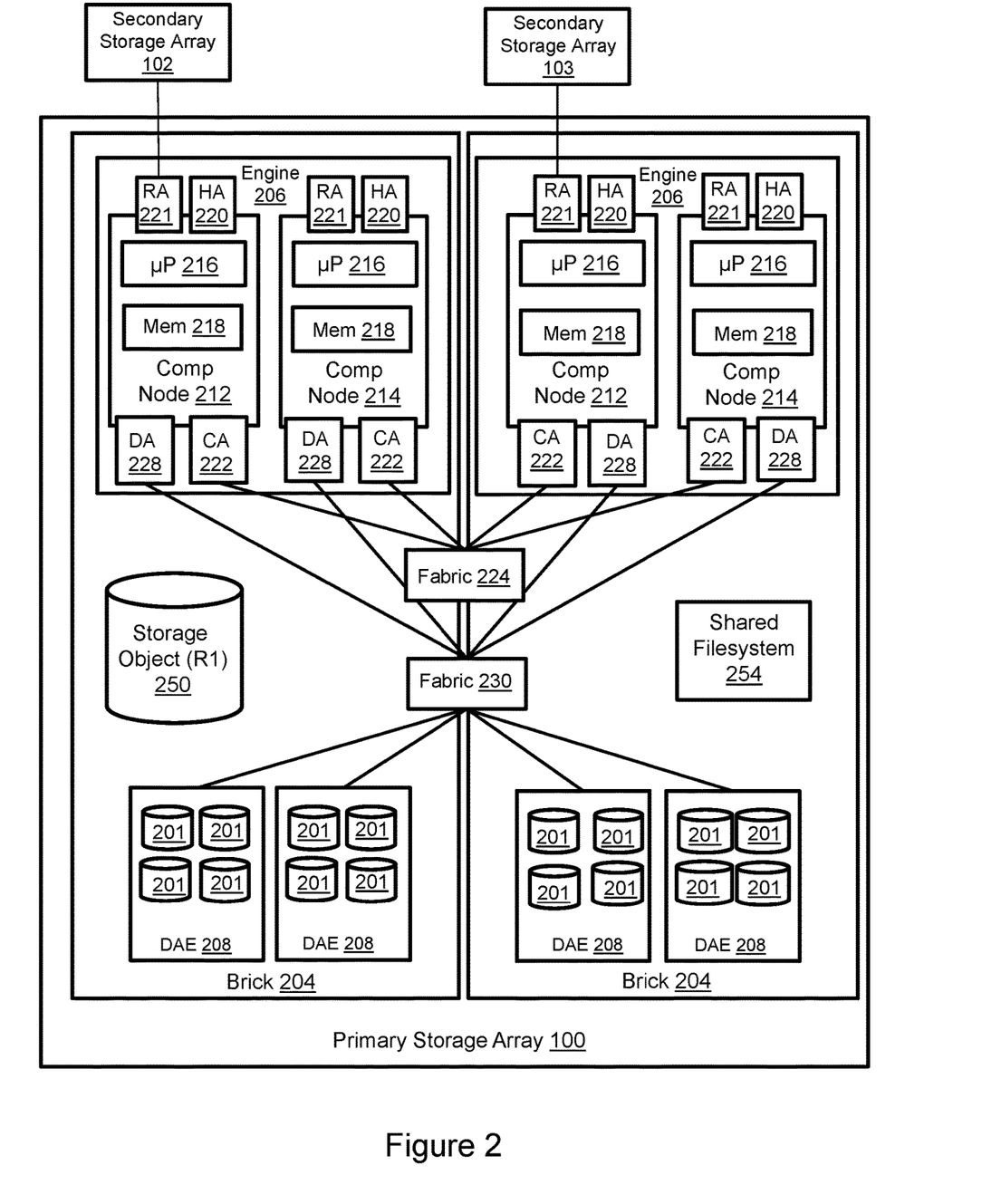
FIG. 2 illustrates the primary storage array in greater detail.

FIG. 2 illustrates the primary storage array 100 in greater detail, although the secondary storage arrays 102, 103 may be architecturally similar or identical to the primary storage array. The primary storage array includes one or more bricks 204. Each brick includes an engine 206 and one or more drive array enclosures (DAEs) 208. Each engine 206 includes a pair of compute nodes 212, 214 that are interconnected via point-to-point links and arranged in a failover relationship. The compute nodes may be referred to as "storage directors" or simply "directors." Although it is known in the art to refer to the compute nodes of a SAN as "hosts," that naming convention is avoided in this disclosure to help distinguish the host servers from the compute nodes 212, 214. Nevertheless, the host applications could run on the compute nodes, e.g., on virtual machines or in containers. Each compute node includes resources such as at least one multi-core processor 216 and local memory 218. The processor may include central processing units (CPUs), graphics processing units (GPUs), or both. The local memory 218 may include volatile media such as dynamic random-access memory (DRAM), non-volatile memory (NVM) such as storage class memory (SCM), or both. Each compute node includes one or more host adapters (HAs) 220 for communicating with the host servers 104, 106 (FIG. 1). Each host adapter has resources for servicing IO commands from the host servers. The host adapter resources may include processors, volatile memory, and ports via which the hosts may access the storage array. Each compute node also includes a remote adapter (RA) 221 for communicating with other storage systems such as the secondary storage arrays 102, 103 (FIG. 1), e.g., for remote mirroring, backup, and replication. Each compute node also includes one or more drive adapters (DAs) 228 for communicating with managed drives 201 in the DAEs 208. Each drive adapter has processors, volatile memory, and ports via which the compute node may access the DAEs for servicing IOs. Each compute node may also include one or more channel adapters (CAs) 222 for communicating with other compute nodes via an interconnecting fabric 224. The managed drives 201 include non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 230 enables implementation of an N-way active-active backend. A back-end connection group includes all drive adapters that can access the same drive or drives. In some implementations every drive adapter 228 in the storage array can reach every DAE via the fabric 230. Further, in some implementations every drive adapter in the storage array can access every managed drive 201.

Referring to FIGS. 1 and 2, data associated with instances of the host application 108 running on the host servers 104, 106 is maintained on the managed drives 201. The managed drives 201 are not discoverable by the host servers but the storage array 100 creates a storage object 250 that can be discovered and accessed by the host servers. Without limitation, the storage object may be referred to as a production device, logical volume, source device, production volume, or production LUN, where the logical unit number (LUN) is a number used to identify logical storage volumes in accordance with the small computer system interface (SCSI) protocol. The storage object 250 is replicated and the version on storage array 100 is the active replica R1, whereas the versions on storage arrays 102, 103 are the passive replicas R2. From the perspective of the host servers, the storage object is a single drive having a set of contiguous fixed-size logical block addresses (LBAs) on which data used by the instances of the host application resides. However, the host application data is stored at non-contiguous addresses on various managed drives 201. The compute nodes maintain metadata that maps between the storage object and the managed drives 201 in order to process IOs from the host servers. In response to data updates of replica R1 resulting from write IOs sent to the primary storage array 100 by the host servers, which may occur continually and with varying burstiness, the storage array 100 enqueues and sends data updates to the secondary storage arrays 102, 103 via the private RDF links 150, 152 using storage-related protocols.

When configured for replication, all of the storage arrays implement a shared filesystem 254 via which metadata and data are shared via the private RDF links 150, 152. A data structure such as a file that is written to a local storage array under the shared file system 254 becomes discoverable and accessible to the other storage arrays. Consequently, a request, response, or message that is encoded in a file and written to one of the storage arrays under the shared filesystem becomes discoverable by, and accessible to, the other storage arrays.

Figure 3:
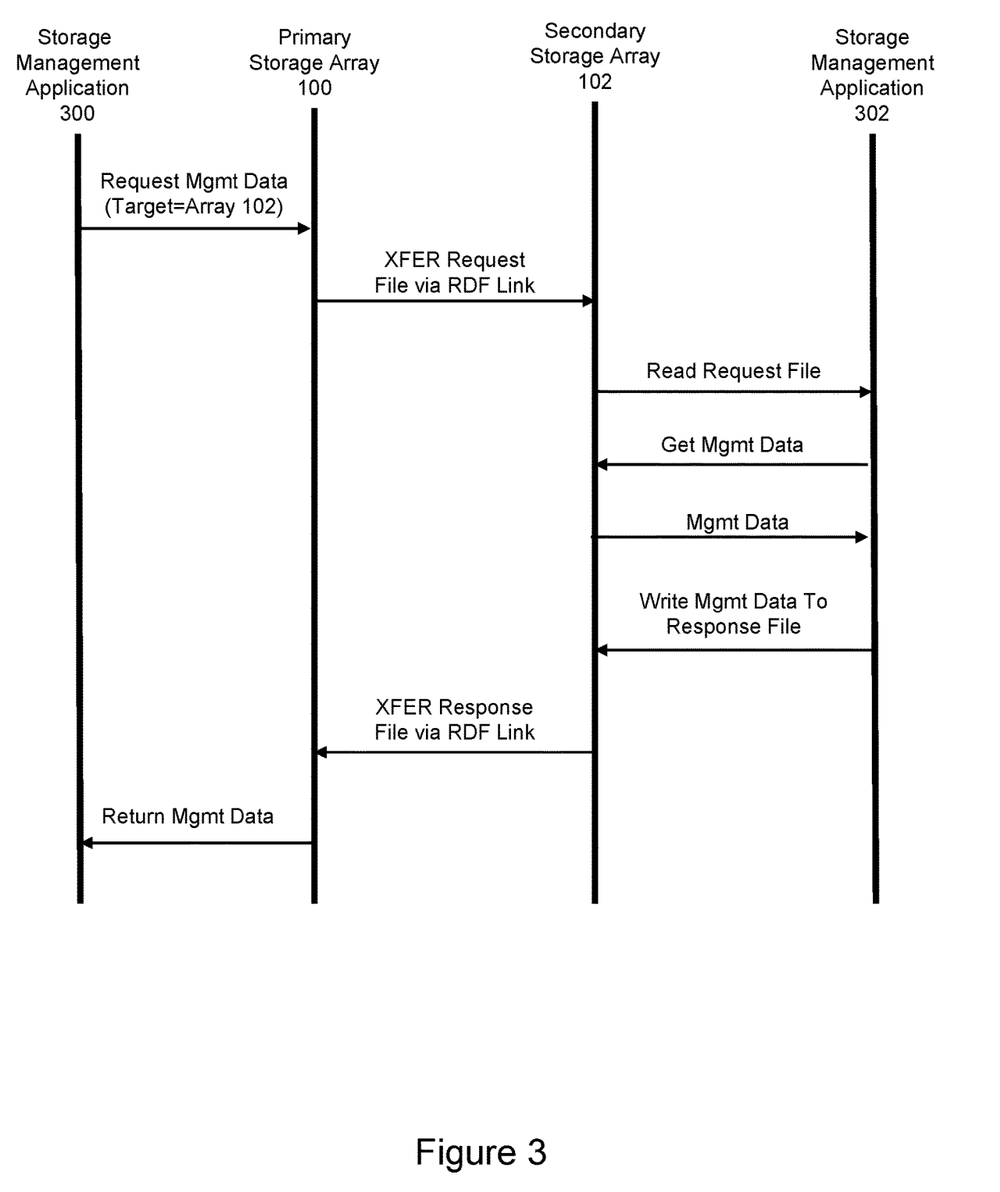
FIG. 3 illustrates communication of a request and corresponding response.

FIG. 3 illustrates peer-to-peer communication of a request and corresponding response. A storage management application 300 runs on management station 150 (FIG. 1). Another storage management application 302 runs on management station 152 (FIG. 1). One or both of the storage management applications could be embedded in the respective primary and secondary storage arrays and controlled with client applications running on the respective management stations. Storage management application 300 encodes a request for management data from storage array 102 as a file. For example, the request may be encoded as an XML file. An example of management data is current workload statistics. The storage management application 300 causes the request file to be written to the primary storage array 100 under the shared filesystem. The request file then becomes discoverable by, and accessible to, the secondary storage array 102 via the private RDF link 150 (FIG. 1). Storage management application 302 periodically polls the secondary storage array 102 to determine whether new files have been written to the shared filesystem. As a result, management station 152 (FIG. 1) finds, decodes, and reads the request file.

In response to the request, storage management application 302 signals to the secondary storage array 102 to get the management data. The secondary storage array then sends the management data to the storage management application 302. The management data is encoded into a response file by the storage management application 302. The response file is written to the secondary storage array 102 under the shared filesystem. The response file then becomes discoverable by, and accessible to, the primary storage array 100 via the private RDF link 150 (FIG. 1). Storage management application 300 periodically polls the primary storage array 100 to determine whether new files have been written to the shared filesystem. As a result, management station 150 (FIG. 1) finds and reads the response file. Any of the management stations may send and receive peer-to-peer requests, responses, and messages using the shared filesystem and private RDF links with the technique described above.

The storage management applications 300, 302 may be written in Java, and the communications may be in Java object graphs sent from one instance to another. The root Java object that is transferred represents the message, request, or response. Each message, request, or response can carry a payload including any Java objects (beans) that the storage management application peers recognize. Advantageously, the storage management applications do not have be of the same version. Backward compatibility is supported by discarding "too new" payloads and forward compatibility is achieved by upgrading older payloads during the decoding process. Further, no predefined contract is required between the peers. The communication works on a best effort basis, while still ensuring type-safe Java based communications.

Requests may specify a "Topic" and be addressed to a particular storage array. The Topic is a namespace for the request that can be used to designate a specific request. An identifier of the request originator is inserted into a request container so that storage management application instances do not respond to their own requests. After writing a request to the shared filesystem, the sender receives a RequestID. The sender uses the RequestID to poll for a response file associated with the request. The sender will wait for another instance of the storage management application to provide a response on behalf of a particular storage array. If multiple storage management applications attempt to provide a response, the first response provided will be used and other responses discarded.

An instance of the storage management application polls the shared filesystem of the local storage array to detect when a new request has been issued for a Topic of interest. The storage management application reads and decodes the XML representing the Java objects that make up the request, and checks that it has not issued the request itself. The storage management application routes the request to an internal RequestProcessor that creates the correct response to the request. The response is inserted into a ResponseContainer that is encoded and written to a reply file on the shared filesystem. The reply file is detected by the request originator, then read and decoded into a Java ResponseContainer. The response is unpacked and delivered to the request originator.

To act as a server for incoming requests, a client registers a "RemoteRequestProcessor". An interface is used to specify how the RemoteRequestProcessor accepts requests and returns the appropriate response, if any. There is only one RemoteRequestProcessor per array ID and Topic, but a single processor can accept requests for multiple array IDs. Request Processors are stored in a SymmRequestProcessorStore, where "Symm" refers to a storage array. This data structure maintains a mapping of array IDs and Topics to the registered request processor and message listeners. Requests are forwarded to a single request processor. Each response is prepared and delivered on its own thread so that it does not delay the servicing of subsequent requests.

To listen for incoming messages, the client can add a "RemoteMessageListener". Multiple listeners can listen to the same array ID and Topic, and a single listener can listen for all messages on a given Topic for all array IDs. Message Listeners are stored in the SymmListenerStore. This data structure maintains a mapping of array IDs and Topics to the registered message listeners.

The storage management applications use a Solutions Enabler SYMAPI mechanism called SFS-RPC to transfer requests and replies between storage management application instances. Requests are addressed to a particular array ID and a particular Topic. The request or reply payload may contain only ASCII string data because the SFS-RPC code is not aware of storage management object structures. The array ID and Topic are also represented as ASCII strings. The storage management application maintains a set of SFS-RPC subscriptions so that it will receive the messages and requests that should be forwarded to the internally registered listeners and processors.

Messages are also associated with a Topic and addressed to a particular storage array. Messages are delivered to every other instance of the storage management application that is subscribed to that Topic and connected to the target storage array (locally or remotely). During publication, the message payload (a graph of Java beans) is inserted into a message container and encoded using the JDK XMLEncoder. An originator ID is inserted into the message container so that storage management applications can ignore their own messages. The encoded Java message container is written to the shared filesystem on the target array. If the target storage array is remote, then the write request is first sent to a local array, then the request is forwarded to the target array across RDF links. Subscribed clients poll the relevant SFS directories on the target array and detect the new file. The clients read and decode the content using the XMLDecoder and their classloaders. Unrecognized (too new) content is discarded at this point if necessary. The decoded message payload is routed in a type-safe manner to internal message listeners that process the messages. All files associated with a message are deleted from the shared filesystem after a specified timeout. New Topics may be added to newer versions of the storage management application. Older storage management application instances ignore unrecognized Topics.

Figure 4:
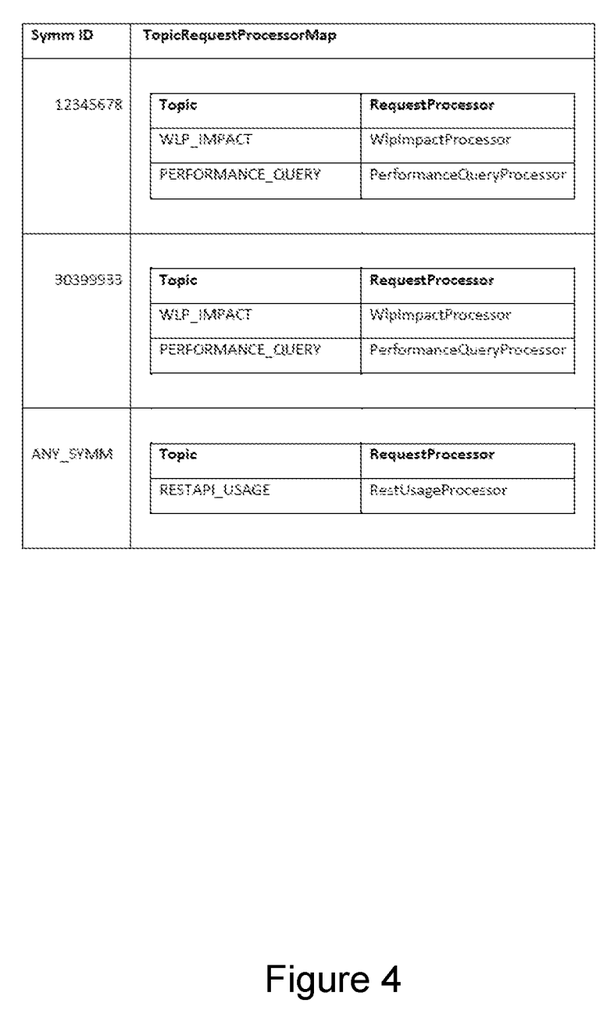
FIG. 4 illustrates examples of request routing by array identifier and topic.

FIG. 4 illustrates examples of how requests are routed and processed. Each storage array is uniquely associated with a symm ID. The symm ID is used in requests to indicate the target of the request. A broadcast ID such as ANY_SYMM may be used to indicate that all storage arrays are targets. The Topic indicates the specific request. Examples of request Topics include but are not limited to current performance queries and REST API usage statistics. The request processor indicates the program that is used to generate response data. Some programs may be capable of generating multiple reports or data sufficient to generate responses to multiple Topics. Storage arrays that are not intended targets may ignore the request. Storage arrays that are intended targets of requests will generate corresponding responses, unless unable to process the request.

Figure 5:
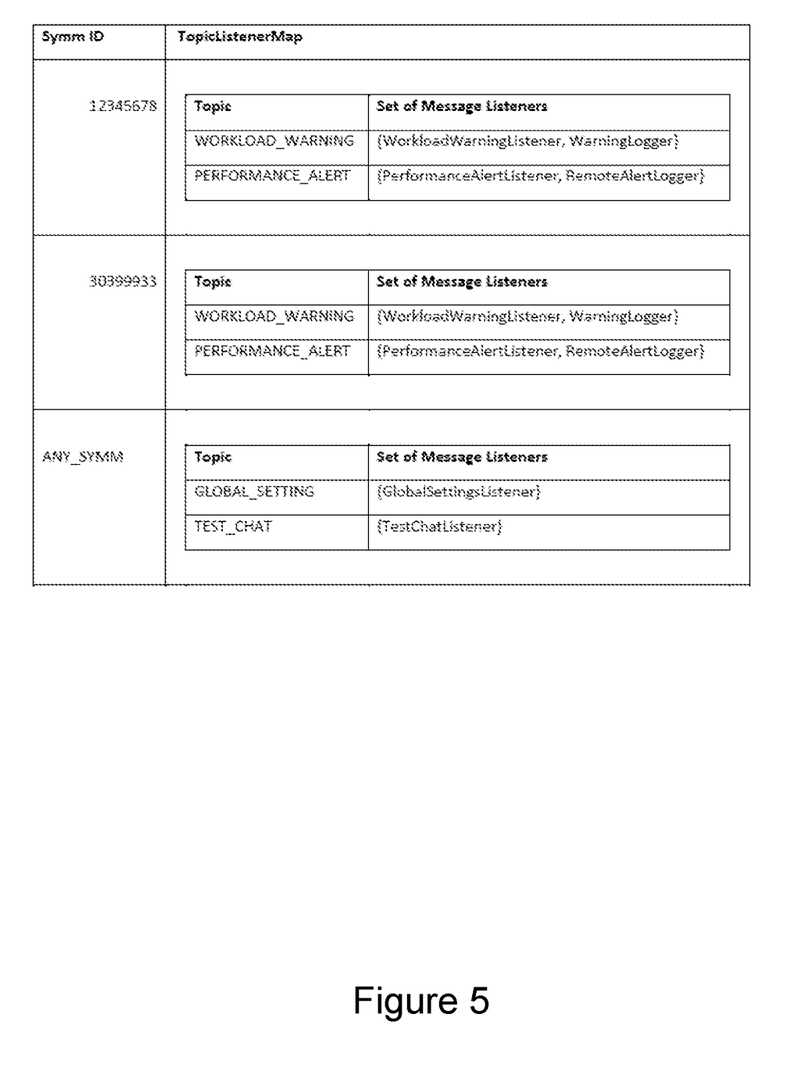
FIG. 5 illustrates examples of message routing by array identifier and topic.

FIG. 5 illustrates examples of how messages are routed and processed. The symm ID is used in messages to indicate the target of the message. A broadcast ID such as ANY_SYMM may be used to indicate that all storage arrays are targets. The Topic indicates the specific message. Examples of message Topics include but are not limited to workload warnings and performance alerts. The set of message listeners indicates the programs that use the Topic. Storage arrays that are not intended targets may ignore the message. Storage arrays that are intended targets of message will update the message listeners, unless unable to process the message. Unlike requests, messages are not intended to prompt generation of responses.

Figure 6:
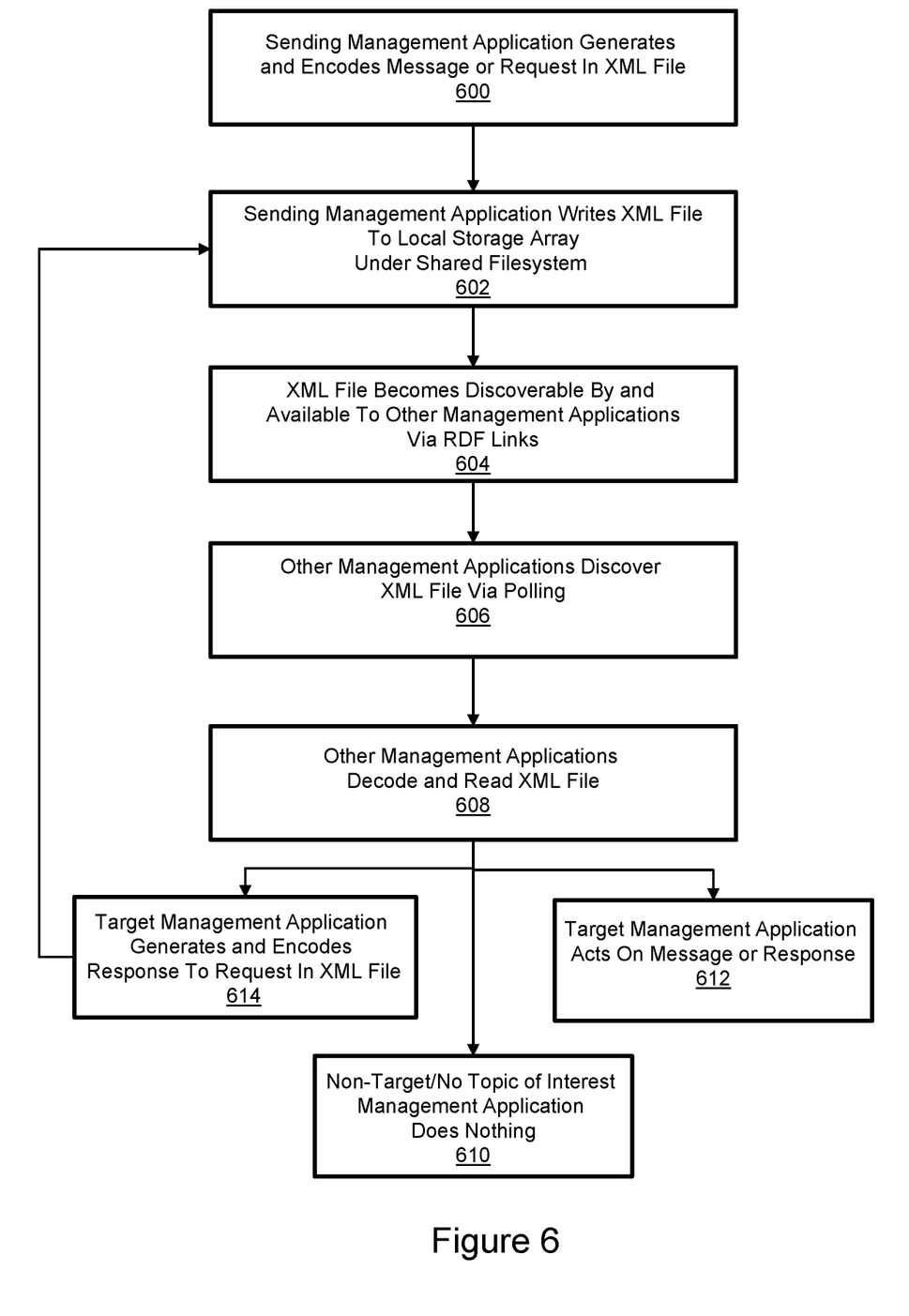
FIG. 6 illustrates steps associated with management stations communicating via private RDF links between storage arrays using a shared filesystem.

FIG. 6 illustrates steps associated with peer-to-peer management station communication via private RDF links between storage arrays using a shared filesystem. A storage management application that is sending a message or request generates and encodes the message or request in a XML file as indicated at step 600. The sending storage management application then writes the XML file to its local storage array under the shared filesystem as indicated in step 602. As a result of being written under the shared filesystem, the XML file becomes discoverable by, and available to, other storage management applications via the RDF links between storage arrays as indicated in step 604. The other storage management applications discover the XML file by polling their local storage arrays as indicated in step 606. The other storage management applications decode and read the XML file as indicated in step 608. Each of the other storage management applications determines from reading the file whether they are designated as a target and whether the file contains a Topic of interest. As indicated in step 610, storage management applications that are not designated targets and that do not recognize a Topic of interest do nothing. As indicated in step 612, storage management applications that recognize a Topic of interest in a message or are designated as the target of a response act upon that message or response. As indicated in step 614, storage management applications that are targets of a request generate and encode a response in an XML file. The response is delivered to the storage management application that generated the request using steps 602, 604, 606, 608, and 612.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method for exchanging peer-to-peer storage management communications between storage management systems, comprising:
  a first storage management station causing a peer-to-peer storage management communication to be generated, changed into a file, and written as the file to a first storage array that is connected to the first storage management station via a first local link, including specifying a target storage array of the storage management request and writing the file under a shared operating system running on the first storage array;
  the first storage array causing the file to become visible and accessible on a second storage array that is non-local relative to the first storage array and runs the shared operating system with the first storage array, and sending the file to the second storage array via a private data replication link; and
  a second storage management station detecting the file on the second storage array via a second local link, changing the file into the peer-to-peer storage management communication, reading the peer-to-peer storage management communication, and acting on the request in response to determining that the second storage array is the target storage array, including causing a response to be generated, changed into a second file, and written to the second storage array as the second file under the shared operating system, the second storage array causing the second file to become visible and accessible on the first storage array and sending the second file to the first storage array via the private data replication link.

2. The method of claim 1 comprising generating and changing a storage management message as the file.

3. The method of claim 2 comprising the first storage management station generating and specifying a topic in the message.

4. The method of claim 3 comprising the second storage management station acting on the storage management message in response to determining that the topic is of interest.

5. The method of claim 1 comprising the first storage management station generating and changing a storage management request as the file.

6. The method of claim 1 comprising the first storage management station detecting the second file on the first storage array, changing the second file into the response, and reading the response.

7. A data replication system, comprising:
   a first storage management station configured to generate a peer-to-peer storage management communication and change the storage management communication into a file, wherein the communication is a request and specifies a target storage array, and the file is an XML file;
   a first storage array that is connected to the first storage management station via a first local link and configured to write the file under a shared operating system;
   a second storage array that is non-local relative to the first storage array and runs the shared operating system with the first storage array, the second storage array connected with the first storage array via a private data replication link via which the file becomes available; and
   a second storage management station configured to detect the file on the second storage array via a second local link, change the file into the peer-to-peer storage management communication, read the peer-to-peer storage management communication, act on the request in response to a determination that the second storage array is the target, cause a response to be generated, changed into a second file, and written to the second storage array as the second file under a shared operating system, the second storage array causing the second file to become visible and accessible on the first storage array and sending the second file to the first storage array via the private data replication link.

8. The data replication system of claim 7 wherein the communication is a message, and the file is an XML file.

9. The data replication system of claim 7 wherein the message comprises a topic.

10. The data replication system of claim 9 wherein the second storage management station is configured to act upon the message in response to a determination that the topic is of interest.

11. The data replication system of claim 7 wherein the first storage management station is configured to detect the second file on the first storage array, change the second file into the response, and read the response.

12. A non-transitory computer-readable storage medium storing instructions that when executed by a computer cause the computer to perform a method for exchanging peer-to-peer storage management communications between storage management systems, the method comprising:
   causing a peer-to-peer storage management communication to be generated, changed into an XML file, and written as the XML file to a first storage array that is connected to a first storage management station via a first local link, including writing the XML file under a shared operating system running on the first storage array, the XML file becoming visible and accessible on a second storage array that is non-local relative to the first storage array and runs the shared operating system with the first storage array, and sending the XML file to the second storage array via a private data replication link;
   a second storage management station detecting the XML file on the second storage array via a second local link, changing the XML file into the peer-to-peer storage management communication, and reading the peer-to-peer storage management communication; and
   the second storage management station causing a response to be generated, changed into a second XML file, and written to the second storage array as the second XML file under the shared operating system, the second storage array causing the second XML file to become visible and accessible on the first storage array and sending the second XML file to the first storage array via the private data replication link.

* * * * *